(12) United States Patent
Han et al.

(10) Patent No.: US 7,933,456 B2
(45) Date of Patent: Apr. 26, 2011

(54) MULTI-LAYER VIDEO CODING AND DECODING METHODS AND MULTI-LAYER VIDEO ENCODER AND DECODER

(75) Inventors: Woo-jin Han, Suwon-si (KR); Bae-keun Lee, Bucheon-si (KR); Sang-chang Cha, Hwaseong-si (KR); Ho-jin Ha, Seoul (KR); Kyo-hyuk Lee, Seoul (KR); Jae-young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1609 days.

(21) Appl. No.: 11/219,764

(22) Filed: Sep. 7, 2005

(65) Prior Publication Data

US 2006/0114999 A1    Jun. 1, 2006

Related U.S. Application Data

(60) Provisional application No. 60/607,343, filed on Sep. 7, 2004.

(30) Foreign Application Priority Data

Nov. 9, 2004    (KR) .................. 10-2004-0090991

(51) Int. Cl.
*G06K 9/36* (2006.01)
*H04B 1/66* (2006.01)
*G06K 9/46* (2006.01)
(52) U.S. Cl. .................... 382/233; 375/240.19
(58) Field of Classification Search .......... 382/232, 382/233, 236, 238, 240, 299; 375/240.1, 375/240.11, 240.15, 240.16, 240.18, 240.19, 375/240.2, 240.24, E7.09, E7.012, E7.015, 375/E7.035; 348/487, 699; 358/1.9, 434, 448

See application file for complete search history.

(56) References Cited

U.S. PATENT DOCUMENTS

| 5,742,343 | A |   | 4/1998  | Haskell et al. |
|-----------|---|---|---------|----------------|
| 5,818,531 | A | * | 10/1998 | Yamaguchi et al. ........ 375/240.2 |
| 6,028,634 | A | * | 2/2000  | Yamaguchi et al. ..... 375/240.16 |
| 6,337,881 | B1 |  | 1/2002  | Chaddha |

(Continued)

FOREIGN PATENT DOCUMENTS

EP    0634871 A2    1/1995

(Continued)

OTHER PUBLICATIONS

Andreopoulos et al. "Spatio-temporal-snr scalable wavelet coding with motion compesated dct base-laver architectures." Proceedings 2003 International Conference on Image Processing (ICIP-2003). Sep. 14, 2003, IEEE, vol. 2, pp. 795-798.

(Continued)

*Primary Examiner* — Amir Alavi
(74) *Attorney, Agent, or Firm* — Sughrue Mion, PLLC

(57) ABSTRACT

Multi-layer video coding and decoding methods, multi-layer video encoder and multi-layer video decoder are provided. The multi-layer video coding method includes encoding a video frame having a predetermined resolution using a first video coding scheme, using a frame encoded by the first video coding scheme as a reference to encode the video frame with the same resolution as the predetermined resolution using a second video coding scheme, and generating a bitstream containing the frames encoded by the first and second video coding schemes.

16 Claims, 10 Drawing Sheets

U.S. PATENT DOCUMENTS

| | | | |
|---|---|---|---|
| 6,437,881 | B1 | 8/2002 | Baba et al. |
| 6,532,263 | B2 | 3/2003 | Radha et al. |
| 6,567,427 | B1 * | 5/2003 | Suzuki et al. ............... 370/535 |
| 6,639,943 | B1 | 10/2003 | Radha et al. |
| 7,336,720 | B2 * | 2/2008 | Martemyanov et al. . 375/240.12 |
| 7,428,639 | B2 * | 9/2008 | Demos .......................... 713/176 |
| 7,436,886 | B2 * | 10/2008 | Hannuksela ............. 375/240.01 |
| 2002/0051581 | A1 * | 5/2002 | Takeuchi et al. ............. 382/240 |
| 2003/0086622 | A1 | 5/2003 | Klein Gunnewiek et al. |
| 2003/0223643 | A1 | 12/2003 | Van Der Schaar |
| 2007/0014346 | A1 * | 1/2007 | Wang et al. ................. 375/240.1 |

FOREIGN PATENT DOCUMENTS

| | | |
|---|---|---|
| EP | 1501311 A1 | 1/2005 |
| JP | 11-266457 A | 9/1999 |
| JP | 2002-520920 A | 7/2002 |
| KR | 1999-0014318 A | 2/1999 |
| KR | 1999-0070553 A | 9/1999 |
| WO | 03/092295 A1 | 11/2003 |

OTHER PUBLICATIONS

Andreopoulos et al. "Response to Call for Proposals on Scalable Video Coding Technology (proposal 21—tool)" Vledo Standards and Drafts, Mar. 8, 2004, No. M10589, pp. 1-7.

Radha et al. "Scalable Internet Video Using MPEG-4" Signal Processing, Image Communication Elsevier Science Publishers, Sep. 1, 1999, vol. 15, No. 1-2, pp. 95-126.

Benzler. "Spatial Scalable Video Coding Using a Combined Sub-band-DCT Approach." IEEE Transactions on Circuits and Systems for Video Technology, IEEE Service Center, Oct. 1, 2000, vol. 10, No. 7, pp. 1080-1087.

Van der Schaar, M. et al., "Embedded DCT and Wavelet Methods for Fine Granular Scalable Video: Analysis and Comparison", Proceedings of SPIE, 2000, pp. 643-653, vol. 3974.

Communication issued on Jul. 16, 2010 by the European Patent Office in the corresponding European Patent Application No. 05780534.3.

* cited by examiner

MULTI-LAYER VIDEO CODING AND DECODING METHODS AND MULTI-LAYER VIDEO ENCODER AND DECODER

CROSS-REFERENCE TO RELATED APPLICATIONS

This application claims priority from Korean Patent Application No. 10-2004-0090991 filed on Nov. 9, 2004 in the Korean Intellectual Property Office, and U.S. Provisional Patent Application No. 60/607,343 filed on Sep. 7, 2004 in the United States Patent and Trademark Office, the disclosures of which are incorporated herein by reference in their entireties.

BACKGROUND OF THE INVENTION

1. Field of the Invention

Apparatuses and method consistent with the present invention relate to a multi-layer video coding algorithm, and more particularly, to a multi-layer video coding algorithm designed to encode a predetermined resolution layer using a plurality of coding algorithms.

2. Description of the Related Art

With the development of information communication technology including Internet, video communication as well as text and voice communication has increased. Conventional text communication cannot satisfy the various demands of users, and thus multimedia services that can provide various types of information such as text, pictures, and music have increased. Multimedia data requires a large capacity storage medium and a wide bandwidth for transmission since the amount of multimedia data is usually large. For example, a 24-bit true color image having a resolution of 640×480 needs a capacity of 640×480×24 bits, i.e., data of about 7.37 Mbits, per frame. When this image is transmitted at a speed of 30 frames per second, a bandwidth of 221 Mbits/sec is required. When a 90-minute movie based on such an image is stored, a storage space of about 1200 Gbits is required. Accordingly, a compression coding method is a requisite for transmitting multimedia data including text, video, and audio.

A basic principle of multimedia data compression is removing data redundancy. In other words, video data can be compressed by removing spatial redundancy in which the same color or object is repeated in an image, temporal redundancy in which there is little change between adjacent frames in a moving image or the same sound is repeated in audio, or mental visual redundancy taking into account human eyesight and limited perception of high frequency.

FIG. 1 shows an environment in which video compression is applied.

Video data is compressed by a video encoder 110. Currently known Discrete Cosine Transform (DCT)-based video compression algorithms are MPEG-2, MPEG-4, H.263, and H.264. In recent years, research into wavelet-based scalable video coding has been actively conducted. Compressed video data is sent to a video decoder 130 via a network 120. The video decoder 130 decodes the compressed video data to reconstruct original video data.

The video encoder 110 compresses the original video data not to exceed the available bandwidth of the network 120 in order for the video decoder 130 to decode the compressed data. However, communication bandwidth may vary depending on the type of the network 120. For example, the available communication bandwidth of an Ethernet is different from that of a wireless local area network (WLAN). A cellular communication network may have a very narrow bandwidth. Thus, research is being actively conducted into a method for generating video data compressed at various bit-rates from the same compressed video data, in particular, scalable video coding.

Scalable video coding is a video compression technique that allows video data to provide scalability. Scalability is the ability to generate video sequences at different resolutions, frame rates, and qualities from the same compressed bitstream. Temporal scalability can be provided using Motion Compensation Temporal filtering (MCTF), Unconstrained MCTF (UMCTF), or Successive Temporal Approximation and Referencing (STAR) algorithm. Spatial scalability can be achieved by a wavelet transform algorithm or multi-layer coding that has been actively studied in recent years. Signal-to-Noise Ratio (SNR) scalability can be obtained using Embedded ZeroTrees Wavelet (EZW), Set Partitioning in Hierarchical Trees (SPIHT), Embedded ZeroBlock Coding (EZBC), or Embedded Block Coding with Optimized Truncation (EBCOT).

FIGS. 2 and 3 illustrate examples of multi-layer bitstream structures.

Referring to FIG. 2, a multi-layer video encoder encodes each layer using an MPEG-4 Advanced Video Coding (AVC) algorithm offering the highest coding efficiency currently available. The MPEG-4 AVC algorithm removes temporal redundancies between frames and uses DCT to transform the resulting frames for quantization.

Referring to FIG. 2, each layer has at least one different resolution, frame rate, and bit-rate. In an AVC scheme, a base layer frame having the lowest resolution, lowest frame rate, and lowest bit-rate is encoded and then an enhancement layer is encoded using the encoded base layer frame. The AVC-based multi-layer video coding scheme uses an AVC-based technique for encoding each layer, providing high coding efficiency. In particular, intra prediction and deblocking techniques used in an AVC algorithm effectively remove most artifacts caused by block-based coding. Furthermore, each layer is optimized with respect to rate-distortion. However, the generated bitstream does not have a flexible scalability. That is, it is difficult to provide fine grain scalability (FGS) and combined scalability using a bitstream generated by multi-layer AVC video coding because scalabilities are dependent on each other. When video data is encoded into many layers, the multi-layer coding scheme shown in FIG. 2 performs AVC encoding on all layers.

Referring to FIG. 3, after encoding a base layer with the lowest resolution, lowest frame rate, and lowest bit-rate using AVC, a layer having the highest resolution, highest frame rate, and highest quality is encoded using the encoded base layer by wavelet coding.

Since the layer having the highest resolution, highest frame rate, and highest quality is encoded using wavelet coding, a coding scheme shown in FIG. 3 can provide a bitstream with full scalability. Furthermore, since the lowest resolution layer is encoded using AVC, a video decoder can reconstruct a video frame of satisfactory quality at the lowest resolution.

While the bitstream shown in FIG. 2 is optimized for each layer with respect to rate-distortion but has weak scalability, the bitstream shown in FIG. 3 has excellent scalability but low video quality since all layers excluding the lowest resolution AVC coded layer are reconstructed from one wavelet coded layer.

SUMMARY OF THE INVENTION

The present invention provides multi-layer video encoding and decoding methods that can offer high coding efficiency and scalability, and multi-layer video encoders and decoders.

According to an aspect of the present invention, there is provided a multi-layer video coding method including encoding a video frame having a predetermined resolution using a first video coding scheme, encoding the video frame with the same resolution as the predetermined resolution using a second video coding scheme with a reference to the frame encoded by the first video coding scheme, and generating a bitstream containing the frames encoded by the first and second video coding schemes.

According to another aspect of the present invention, there is provided a multi-layer video coding method including generating a lower-resolution video frame by downsampling a video frame, encoding the lower-resolution video frame, encoding the video frame using the encoded lower-resolution video frame as a reference, and generating a bitstream containing the encoded lower-resolution video frame and the video frame, wherein the encoding the lower-resolution video frame comprises encoding the lower-resolution video frame using a first video coding scheme, and encoding the lower-resolution video frame using a second video coding scheme with reference to the lower-resolution frame encoded by the first video coding scheme.

According to still another aspect of the present invention, there is provided a multi-layer video coding method including (a) encoding a video frame having a predetermined resolution using a first video coding scheme, (b) encoding the video frame with the same resolution as the predetermined resolution using a second video coding scheme with a reference to the frame encoded by the first video coding scheme, and (c) generating a bitstream containing encoded frames of all resolution layers, wherein the step (a) and the step (b) are performed recursively on all resolution layers in the order from a lower-resolution layer to a higher-resolution layer.

According to a further aspect of the present invention, there is provided a multi-layer video encoder including a downsampler downsampling a higher-resolution video frame to generate a lower-resolution video frame, a lower-resolution video encoding unit encoding the lower-resolution video frame, a higher-resolution video encoding unit encoding the higher-resolution video frame using the encoded lower-resolution video frame as a reference, and a bitstream generator generating a bitstream containing the encoded lower-resolution frame and the encoded higher-resolution video frame, wherein the lower-resolution video encoding unit encodes the lower-resolution video frame using a first video coding scheme and uses the lower-resolution frame encoded by the first video coding scheme to encode the lower-resolution video frame with a second video coding scheme, thereby generating the encoded lower-resolution frame.

According to yet another aspect of the present invention, there is provided a multi-layer decoding method including extracting a frame encoded by a first video coding scheme and a frame encoded by a second video coding scheme from a bitstream, decoding the frame encoded by the first video coding scheme using a first video decoding scheme to reconstruct a first frame, and decoding the frame encoded by the second video coding scheme with a reference to the reconstructed first frame with the same resolution as the reconstructed first frame using a second video decoding scheme to reconstruct a second frame.

According to still yet another aspect of the present invention, there is provided a multi-layer decoding method including extracting a frame encoded by a first video coding scheme and a frame encoded by a second video coding scheme from a bitstream, decoding the frame encoded by the first video coding scheme using a first video decoding scheme to reconstruct a first frame, decoding the frame encoded by the second video coding scheme with the same resolution as the reconstructed first frame using a second video decoding scheme to reconstruct a second frame, and adding the reconstructed second frame to the reconstructed first frame to reconstruct a video frame.

According to another aspect of the present invention, there is provided a multi-layer video decoding method including extracting an encoded lower-resolution layer frame and an encoded higher-resolution layer frame from a bitstream, decoding the encoded lower-resolution layer frame to reconstruct a lower-resolution layer frame, and decoding the encoded higher-resolution layer frame to reconstruct a higher-resolution layer frame with reference to the reconstructed lower-resolution layer frame, wherein the encoded lower-resolution layer frame includes a frame encoded by a first video coding scheme and a frame encoded by a second video coding scheme, and wherein the decoding the lower-resolution layer frame comprises decoding the frame encoded by the first video coding scheme using a first video decoding scheme to reconstruct a first frame, and decoding the frame encoded by the second video coding scheme using a second video decoding scheme with reference to the reconstructed first frame to reconstruct a second frame.

According to another aspect of the present invention, there is provided a multi-layer video decoding method including extracting an encoded lower-resolution layer frame and an encoded higher-resolution layer frame from a bitstream, decoding the encoded lower-resolution layer frame to reconstruct a lower-resolution layer frame, and decoding the encoded higher-resolution layer frame with reference to the reconstructed lower-resolution layer frame to reconstruct a higher-resolution layer frame, wherein the encoded lower-resolution layer frames includes a frame encoded by a first video coding scheme and a frame encoded by a second video coding scheme, and wherein the decoding the lower-resolution layer frame comprises decoding the frame encoded by the first video coding scheme using a first video decoding scheme to reconstruct a first frame, decoding the frame encoded by the second video coding scheme using a second video decoding scheme to reconstruct a second frame, and adding the reconstructed second frame to the reconstructed first frame to reconstruct a lower-resolution layer video frame.

According to another aspect of the present invention, there is provided a multi-layer video decoding method including extracting an encoded lower-resolution layer frame and an encoded higher-resolution layer frame from a bitstream, decoding the encoded lower-resolution layer frame to reconstruct a lower-resolution layer frame, and decoding the encoded higher-resolution layer frame with reference to the reconstructed lower-resolution layer frame to reconstruct a higher-resolution layer frame, wherein the encoded lower-resolution layer frame includes a frame encoded by a first video coding scheme and a frame encoded by a second video coding scheme, and wherein the decoding the lower-resolution layer frame comprises decoding the frame encoded by the first video coding scheme using a first video decoding scheme to reconstruct a first frame, decoding the frame encoded by the second video coding scheme using a second video decoding scheme to reconstruct a second frame, and adding the reconstructed second frame to the reconstructed first frame to reconstruct a lower-resolution layer video frame.

According to another aspect of the present invention, there is provided a multi-layer video decoding method including extracting an encoded lower-resolution layer frame and an encoded higher-resolution layer frame from a bitstream and decoding the encoded lower-resolution layer frame and the encoded higher-resolution layer frame to reconstruct a video frame, wherein an encoded frame of each resolution layer includes a frame encoded by a first video coding scheme and a frame encoded by a second video coding scheme, the method comprising decoding the frame encoded by the first video coding scheme for a predetermined resolution layer using a first video decoding scheme to reconstruct a first frame, and decoding the frame encoded by the second video coding scheme for the resolution layer using a second video decoding scheme with reference to the reconstructed first frame to reconstruct the second frame, and wherein the decoding the frame encoded by the first video coding scheme and the decoding the frame encoded by the second video coding scheme are performed recursively on all resolution layers in the order from a lower resolution layer to a higher resolution layer.

According to another aspect of the present invention, there is provided a multi-layer video decoding method including extracting an encoded lower-resolution layer frame and an encoded higher-resolution layer frame from a bitstream and decoding the encoded lower-resolution layer frame and the encoded higher-resolution layer frame to reconstruct a video frame, wherein an encoded video frame of each resolution layer includes a frame encoded by a first video coding scheme and a frame encoded by a second video coding scheme, the method comprising decoding the frame encoded by a first video coding scheme for a predetermined resolution layer using a first video decoding scheme to reconstruct a first frame, decoding the frame encoded by the second video coding scheme for the resolution layer using a second video decoding scheme to reconstruct a second frame, and adding the reconstructed second frame to the reconstructed first frame to thereby reconstruct a video frame in the resolution layer, wherein the decoding the frame encoded by a first video coding scheme, the decoding the frame encoded by the second video coding scheme, and the adding to reconstruct the video frame are performed recursively on all resolution layers in the order from a lower resolution layer to a higher resolution layer.

According to another aspect of the present invention, there is provided a multi-layer video decoder including a bitstream interpreter interpreting a bitstream to extract an encoded lower-resolution layer frame and an encoded higher-resolution layer frame, a lower-resolution video decoding unit decoding the encoded lower-resolution layer frame, and a higher-resolution video decoding unit decoding the encoded higher-resolution layer frame using the reconstructed lower-resolution layer frame as a reference, wherein the lower-resolution video decoding unit decodes a frame encoded by a first video coding scheme using a first video decoding scheme to reconstruct a first frame and uses the first frame to decode a frame encoded by a second video coding scheme using a second video decoding scheme, thereby reconstructing the lower-resolution layer frame.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
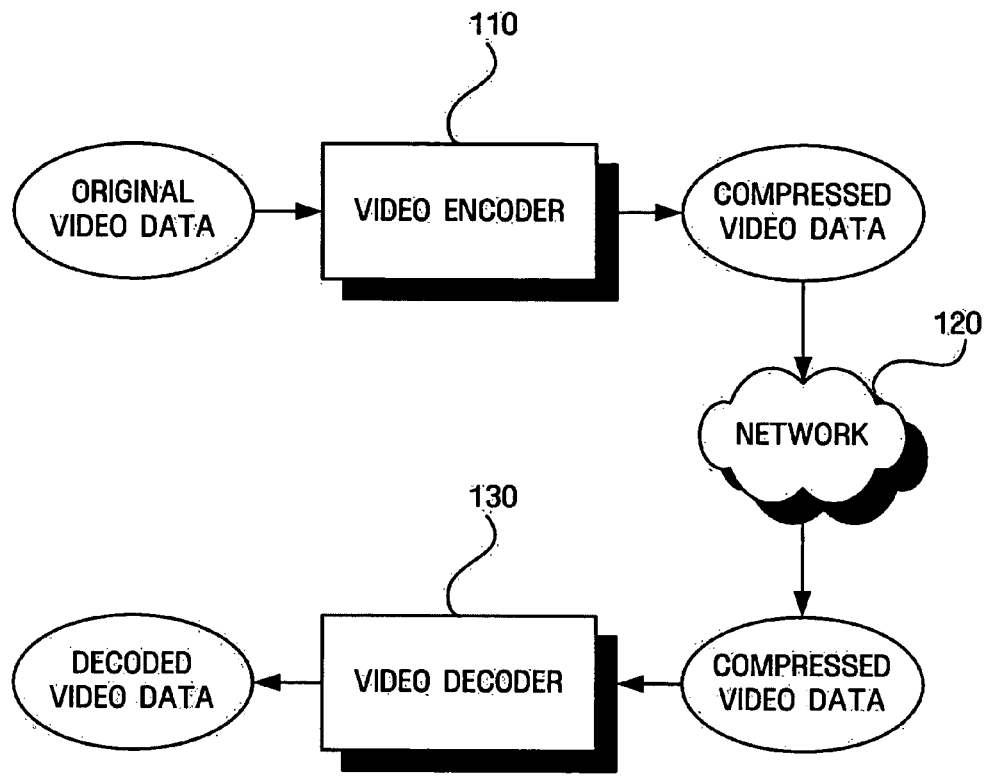
FIG. 1 shows an environment in which video compression is applied.
Figure 2:
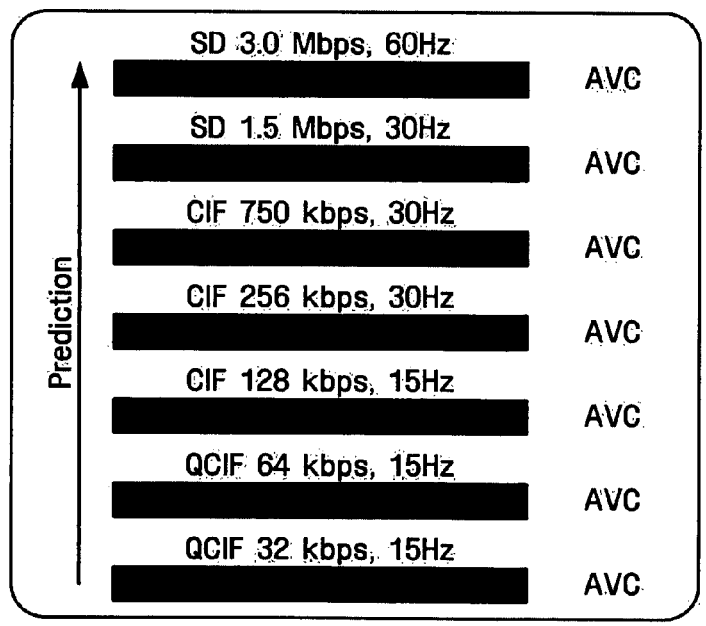
FIGS. 2 and 3 show examples of multi-layer video bitstream structures.
Figure 3:
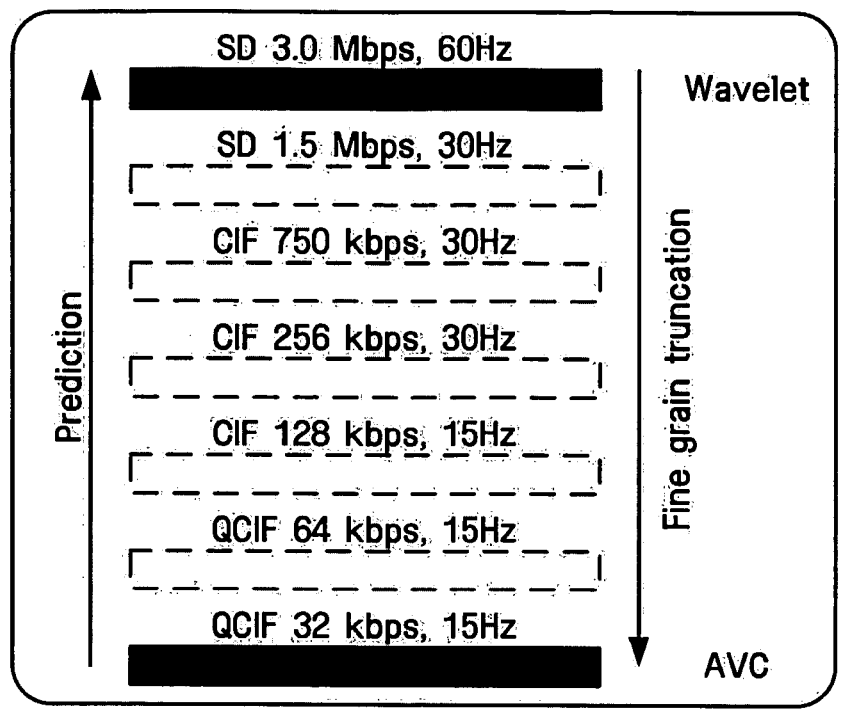

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will now be described more fully with reference to the accompanying drawings, in which exemplary embodiments of the invention are shown.

Figure 4:
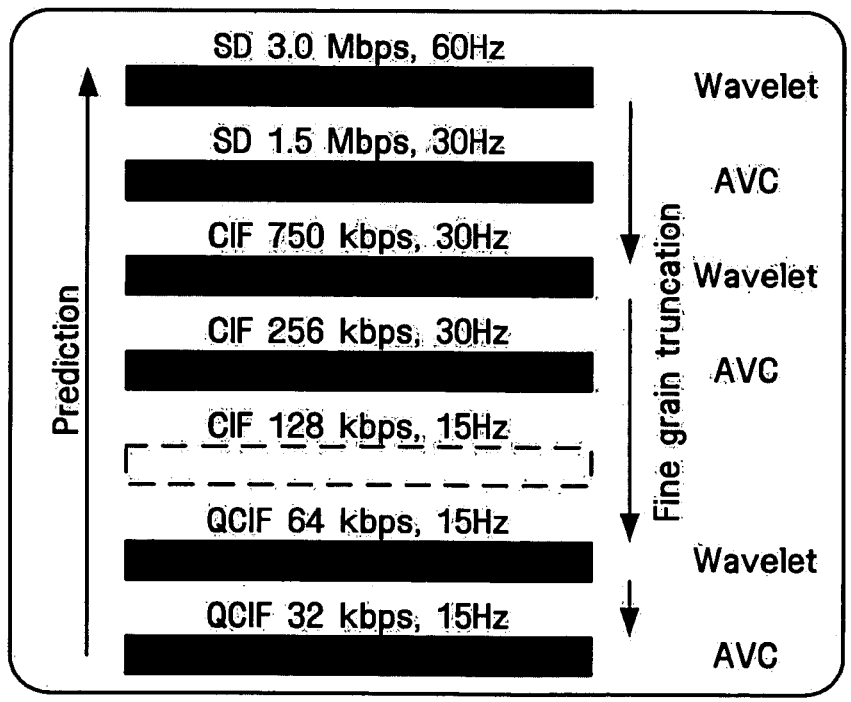
FIG. 4 shows the structure of a multi-layer video bitstream according to an exemplary embodiment of the present invention.

FIG. 4 shows the structure of a multi-layer video bitstream according to an exemplary embodiment of the present invention.

Referring to FIG. 4, a bitstream generated by multi-layer video coding has two layers for each resolution. One layer is encoded using Advanced Video Coding (AVC) while the other layer is encoded using wavelet coding. Throughout this specification, AVC coding or AVC layer refers to coding or layer adopting Discrete Cosine Transform (DCT) and quantization in an AVC algorithm. Wavelet coding or wavelet layer refers to coding or layer adopting wavelet transform and embedded quantization. To generate a bitstream having temporal scalability, AVC coding and wavelet coding schemes respectively employ an MCTF, UMCTF, or STAR algorithm providing temporal scalability.

An AVC layer for each resolution ensures coding efficiency at the level of spatio-temporal-quality while a wavelet layer ensures fine grain scalability (FGS). A predecoder simply truncates a part of a wavelet layer bitstream to produce a bitstream having a quality between the quality of AVC layer and the quality of wavelet layer. The same truncation scenario will apply to multiple layers.

For example, the predecoder may produce a bitstream with QCIF resolution and 32 to 64 kbps quality from the bitstream shown in FIG. 4. To accomplish this, the predecoder truncates all CIF and SD resolution layers and all or part of each QCIF resolution wavelet layer.

Figure 5:
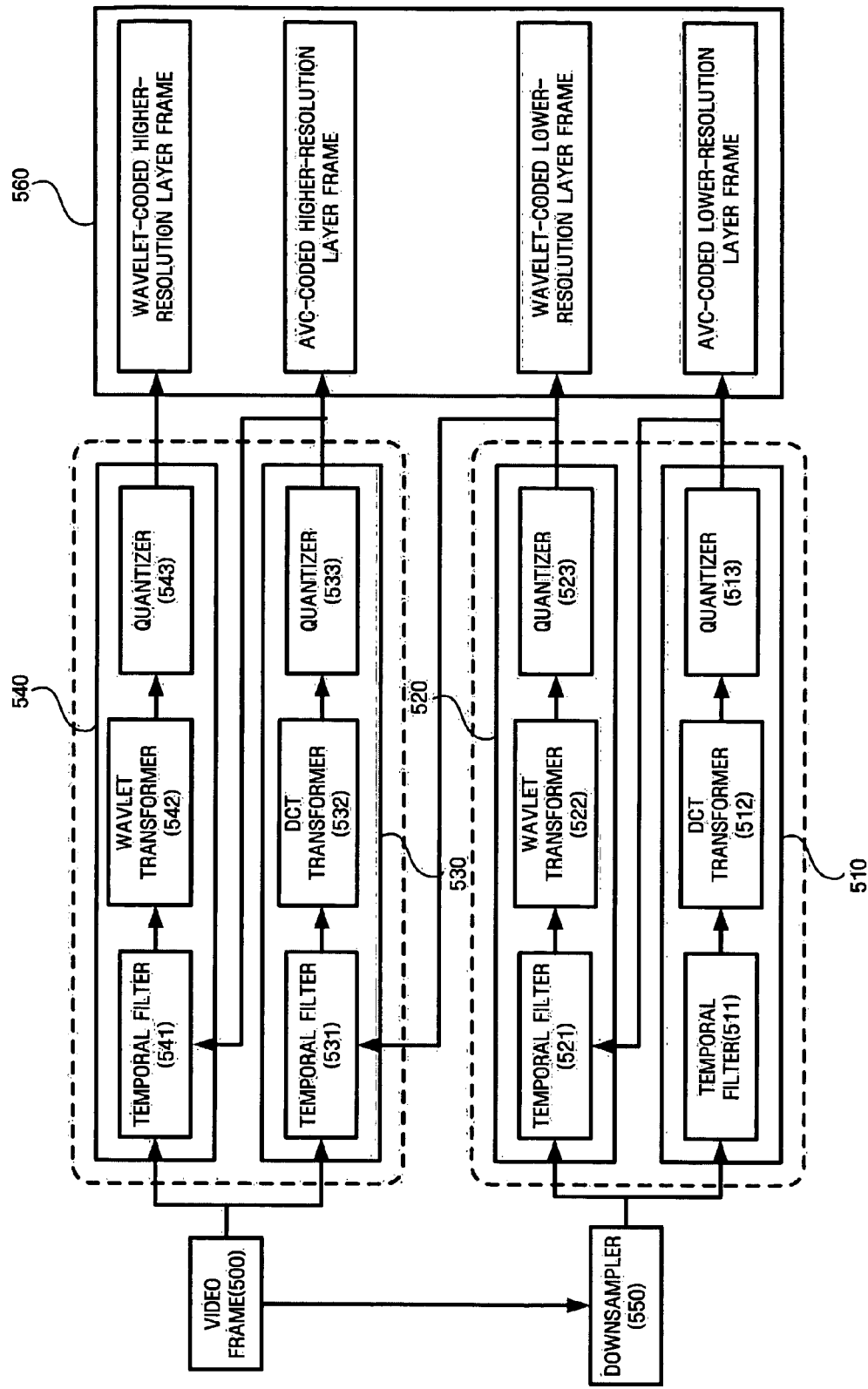
FIG. 5 is a block diagram of a multi-layer video encoder according to an exemplary embodiment of the present invention.

An example of a video encoder generating a multi-layer bitstream according to an exemplary embodiment of the present invention is shown in FIG. 5. For convenience of explanation, it is assumed that the video encoder has coding units for two resolution layers.

FIG. 5 is a block diagram of a multi-layer video encoder according to an exemplary embodiment of the present invention.

Referring to FIG. 5, the multi-layer video encoder includes a downsampler 550, an AVC coding unit 510 and a wavelet coding unit 520 encoding low resolution layer video frames, an AVC coding unit 530 and a wavelet coding unit 540 encoding high resolution layer video frames, and a bitstream generator 560 generating a bitstream.

More specifically, the downsampler 550 downsamples a video frame to produce a low-resolution video frame.

The multi-layer video encoder has two coding units, i.e., AVC coding unit and wavelet coding unit, for each resolution layer. That is, the multi-layer video encoder includes the AVC coding unit 510 and the wavelet coding unit 520 for encoding low-resolution layer video frames and the AVC coding unit 530 and the wavelet coding unit 540 for encoding high-resolution layer video frame.

The bitstream generator 560 generates a bitstream containing encoded low- and high-resolution layer frames.

A process for generating a bitstream will now be described.

First, the downsampler 550 downsamples a video frame 500 to produce a low-resolution video frame with half the resolution of the video frame. The low-resolution video frame is sent to the AVC coding unit 510 and the wavelet coding unit 520 for the low resolution layer while the video frame 500 is sent to the AVC coding unit 530 and the wavelet coding unit 540 for the high-resolution layer.

The AVC coding unit 510 for the low-resolution layer includes a temporal filter 511 removing temporal redundancy present within the low-resolution frame, a DCT transformer 512 performing DCT on the low-resolution frame in which the temporal redundancy has been removed, and a quantizer 513 quantizing the DCT-transformed low-resolution frame. The AVC-coded low-resolution layer frame is provided to perform wavelet coding for the low-resolution layer.

The wavelet coding unit 520 for the low-resolution layer includes a temporal filter 521 removing temporal redundancy within the low-resolution frame using the AVC-coded low-resolution layer frame, a wavelet transformer 522 performing wavelet transform on the low-resolution frame, and a quantizer 523 quantizing the wavelet-transformed low-resolution frame. The wavelet-coded low-resolution layer frame is provided to perform AVC coding for the high-resolution layer.

The AVC coding unit 530 for the high-resolution layer includes a temporal filter 531 removing temporal redundancy present in the high-resolution frame 500 using the wavelet-coded low-resolution layer frame, a DCT transformer 532 performing DCT on the high-resolution frame in which the temporal redundancy has been removed, and a quantizer 533 quantizing the DCT-transformed high-resolution frame. The AVC-coded high-resolution layer frame is provided to perform wavelet coding for the high-resolution layer.

The wavelet coding unit 540 for the high-resolution layer includes a temporal filter 541 removing temporal redundancy present within the high-resolution frame 500 using the AVC-coded high-resolution layer frame, a wavelet transformer 542 performing wavelet transform on the high-resolution frame, and a quantizer 543 quantizing the wavelet-transformed high-resolution frame. The wavelet-coded high-resolution layer frame is provided to perform wavelet coding for the high-resolution layer.

The bitstream generator 560 generates a bitstream containing the AVC-coded and wavelet-coded low-resolution layer frames and the AVC-coded and wavelet-coded high-resolution layer frames. The bitstream contains information about the coded frames, header information including a sequence header, a group-of-pictures (GOP) header, and a frame header, and other information such as motion vectors obtained during temporal filtering.

The bitstream is predecoded by a predecoder (not shown) and sent to a multi-layer video decoder. For example, the predecoder may truncate a high-resolution layer of the bitstream to produce a bitstream containing only coded low-resolution layer frames for a device having a small display screen such as cellular phone or personal digital assistant (PDA). The predecoder may also truncate a part of the bitstream to produce a bitstream with a low bit-rate when a network condition is bad. Meanwhile, when the required frame rate is low, the predecoder truncates some frames of the bitstream to generate a bitstream with a low frame rate.

Figure 6:
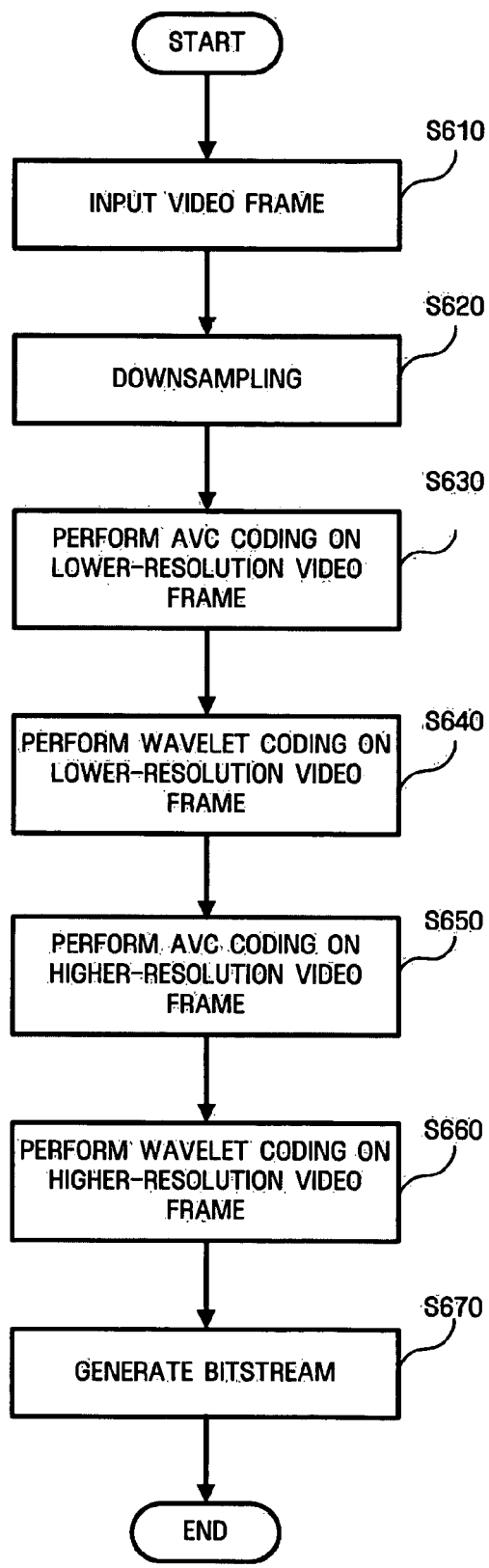
FIG. 6 is a flowchart illustrating a multi-layer video coding process according to an exemplary embodiment of the present invention.

FIG. 6 is a flowchart illustrating a multi-layer video encoding process.

Referring to FIG. 6, in operation S610, a video frame is input into a multi-layer video encoder and in operation S620, the multi-video encoder downsamples the input video frame into a lower resolution. The multi-video encoder uses an MPEG downsampler to downsample the input video frame because the MPEG downsampler can produce a smoothed, downsampled version of low-resolution image compared to a wavelet downsampler currently available. However, any other filter that can obtain a downsampled version of image may be used for downsampling. To obtain a bitstream having three resolution layers, the multi-layer video encoder downsamples the input video frame by factors of two and four to generate half and quarter resolution frames. To obtain a bitstream having four resolution layers, the multi-layer video encoder downsamples the input video frame by factors of two, four, and eight to generate half, quarter, and eighth resolution frames.

In operation S630, the multi-layer video encoder performs AVC coding on the low-resolution video frame. In operation S640, the encoder performs wavelet coding on the low-resolution video frame using the AVC-coded low-resolution video frame. For example, after performing AVC coding to produce an AVC-coded video frame having a QCIF resolution, a 15 Hz frame rate, and a 32 kbps bit-rate, the encoder performs wavelet coding to generate a wavelet-coded frame with the same resolution and frame rate as the AVC-coded video frame and a 64 kbps bit-rate using the AVC-coded frame as a reference.

After encoding the low-resolution frame, the multi-layer video encoder encodes a high-resolution video frame using the encoded low-resolution frame.

More specifically, in operation S650, the encoder performs AVC coding on a high-resolution video frame. In operation S660, the encoder performs wavelet coding on the high-resolution video frame using the AVC-coded high-resolution video frame. For example, after performing AVC coding to produce an AVC-coded video frame having a CIF resolution, a 30 Hz frame rate, and a 256 kbps bit-rate, the encoder performs wavelet coding to generate a wavelet-coded frame with a CIF resolution, a 30 Hz frame rate and a 750 kbps bit-rate using the AVC-coded and wavelet-coded QCIF resolution video frames and the AVC-coded CIF frame as references. Once video coding is performed on all resolution layers, in operation S670, the multi-layer video encoder uses coded video frames to generate a bitstream.

Figure 7:
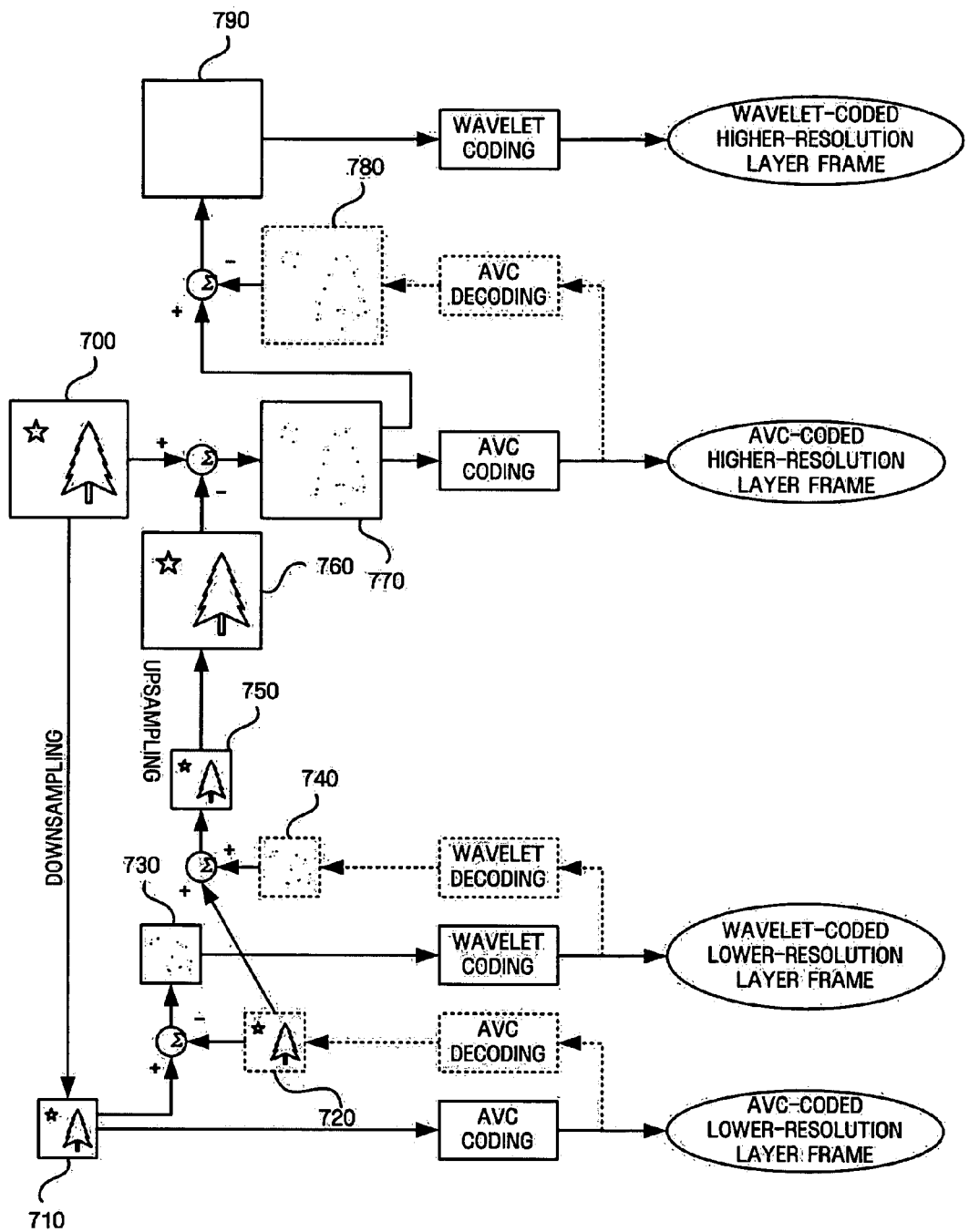
FIGS. 7 and 8 illustrate detailed multi-layer video coding processes according to exemplary embodiments of the present invention.
Figure 8:
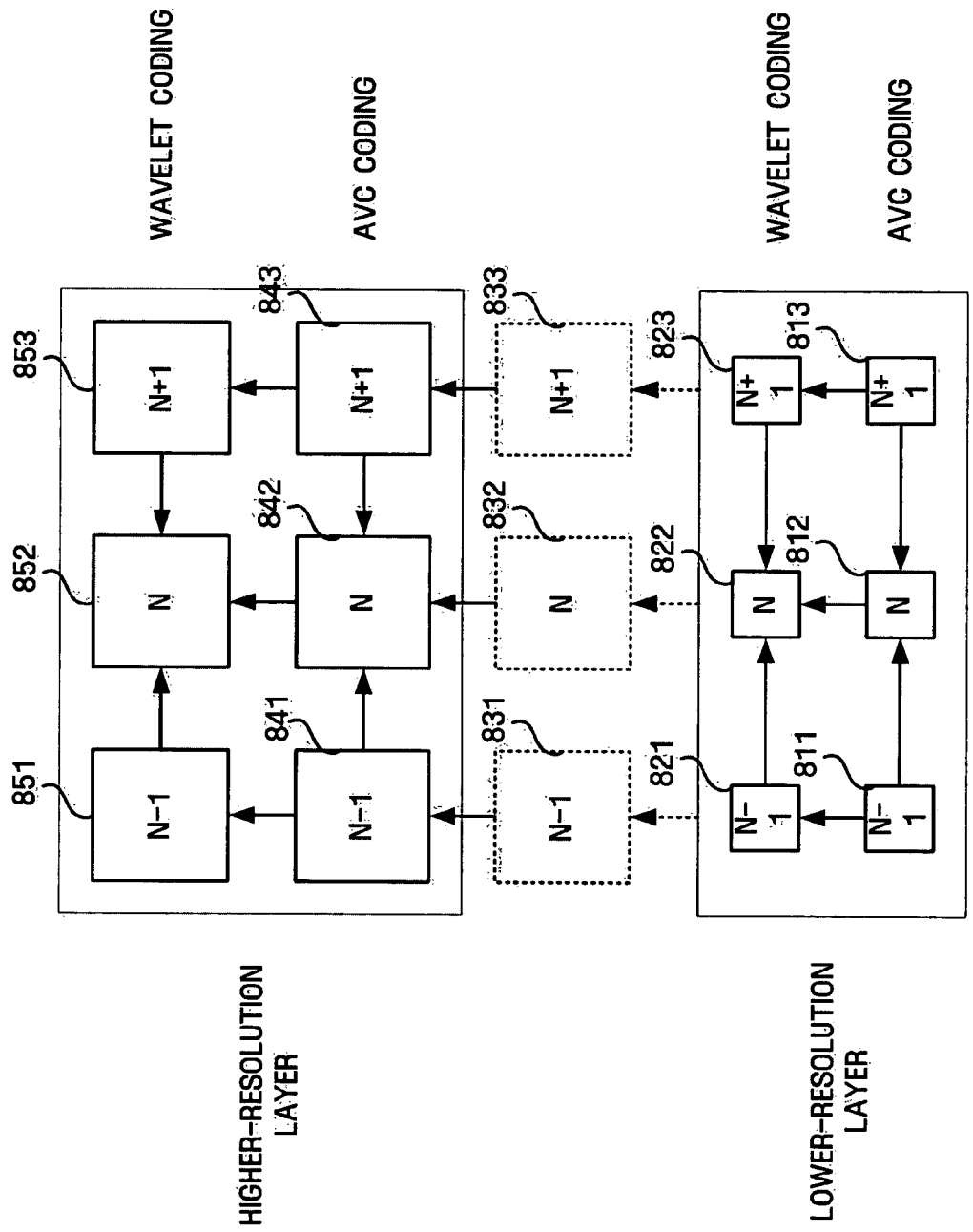

FIGS. 7 and 8 illustrate examples of detailed multi-layer video coding processes according to exemplary embodiments of the present invention. While FIGS. 7 and 8 show that video coding is performed on two resolution layers, video coding may be performed on three or more resolution layers in the same way.

An exemplary embodiment of the present invention shown in FIG. 7 will first be described.

A multi-layer video encoder downsamples a video frame 700 to generate a low-resolution video frame 710 and then performs AVC coding on the low-resolution video frame 710 to produce an AVC-coded low-resolution layer frame that will be contained in a bitstream.

Then, the multi-layer video encoder decodes the AVC-coded low-resolution layer frame to obtain a decoded frame 720 and compares the decoded frame 720 with the low-resolution video frame 710 to obtain a low-resolution residual frame 730.

The encoder performs wavelet coding on the low-resolution residual frame 730 to generate a wavelet-coded low-resolution layer frame and then decodes the wavelet-coded low-resolution layer frame to obtain a decoded frame 740 that is then added to the decoded frame 720 to obtain a decoded low-resolution layer video frame 750.

The encoder upsamples the decoded low-resolution layer video frame 750 into a higher resolution and compares the upsampled version of frame 760 with the video frame 700 to obtain a high-resolution layer frame 770. AVC coding is performed on the high-resolution layer frame 770 to generate an AVC-coded high-resolution layer frame that will be contained in the bitstream. The AVC-coded high-resolution layer frame is decoded to obtain a decoded frame 780 and the decoded frame 780 is compared with the high-resolution layer frame 770 to thereby obtain a high-resolution residual frame 790.

Wavelet coding is then performed on the high-resolution residual frame 790 to obtain a wavelet-coded high-resolution layer frame that will be contained in the bitstream.

The multi-layer video encoder finally generates the bitstream containing the AVC-coded and wavelet-coded low-resolution layer frames and the AVC-coded and wavelet-coded high-resolution layer frames.

Next, referring to FIG. 8, a multi-layer video encoder downsamples a high-resolution video frame to generate a low-resolution video frame and performs AVC coding on the low-resolution video frame to produce an AVC-coded low-resolution layer video frame, followed by wavelet coding on the low-resolution video frame using the AVC-coded low-resolution layer video frame.

More specifically, N−1-th and N+1-th low-resolution video frames 811 and 813 are used to encode an N-th low-resolution video frame 812. While the low-resolution video frames 811 and 813 are used as references for open-loop video coding, frames reconstructed after decoding AVC-coded low-resolution video frames are used for closed-loop video coding.

After completing AVC coding for the low-resolution layer, the multi-layer video encoder performs wavelet coding for the low-resolution layer. The multi-layer video encoder may encode an N-th low-resolution video frame 822 using N−1-th and N+1-th low-resolution video frames 821 and 823 or frames reconstructed by decoding AVC-coded frames.

After completing video encoding for the low-resolution layer, the encoder performs video coding on a high-resolution layer.

AVC coding may be performed on an N-th high-resolution layer video frame 842 using N−1-th and N+1-th high-resolution layer video frames 841 and 843 or a frame reconstructed by decoding the N-th low-resolution video frame 822. The reconstructed frame is upsampled to generate a video frame 832 before it can be used as a reference.

Then, the encoder performs wavelet coding on an N-th high-resolution layer video frame 852 using N−1-th and N+1-th high-resolution layer video frames 851 and 853 or frames reconstructed by decoding the N-th high-resolution layer video frame 842.

The multi-layer video coding process shown in FIG. 7 involves inter-layer referencing after temporal filtering while the video coding process shown in FIG. 8 includes inter-layer referencing during temporal filtering. When a large amount of motion is present in the bitstream, the coding process shown in FIG. 7 can provide better coding efficiency than the process shown in FIG. 8 since spatial relationship between frames is closer than temporal relationship therebetween. Conversely, when a small amount of motion is present in the bitstream, the latter can exhibit higher coding efficiency than the former because temporal relationship between frames is closer than spatial relationship therebetween.

A process of allocating a bit-rate for each layer will now be described.

Figure 9:
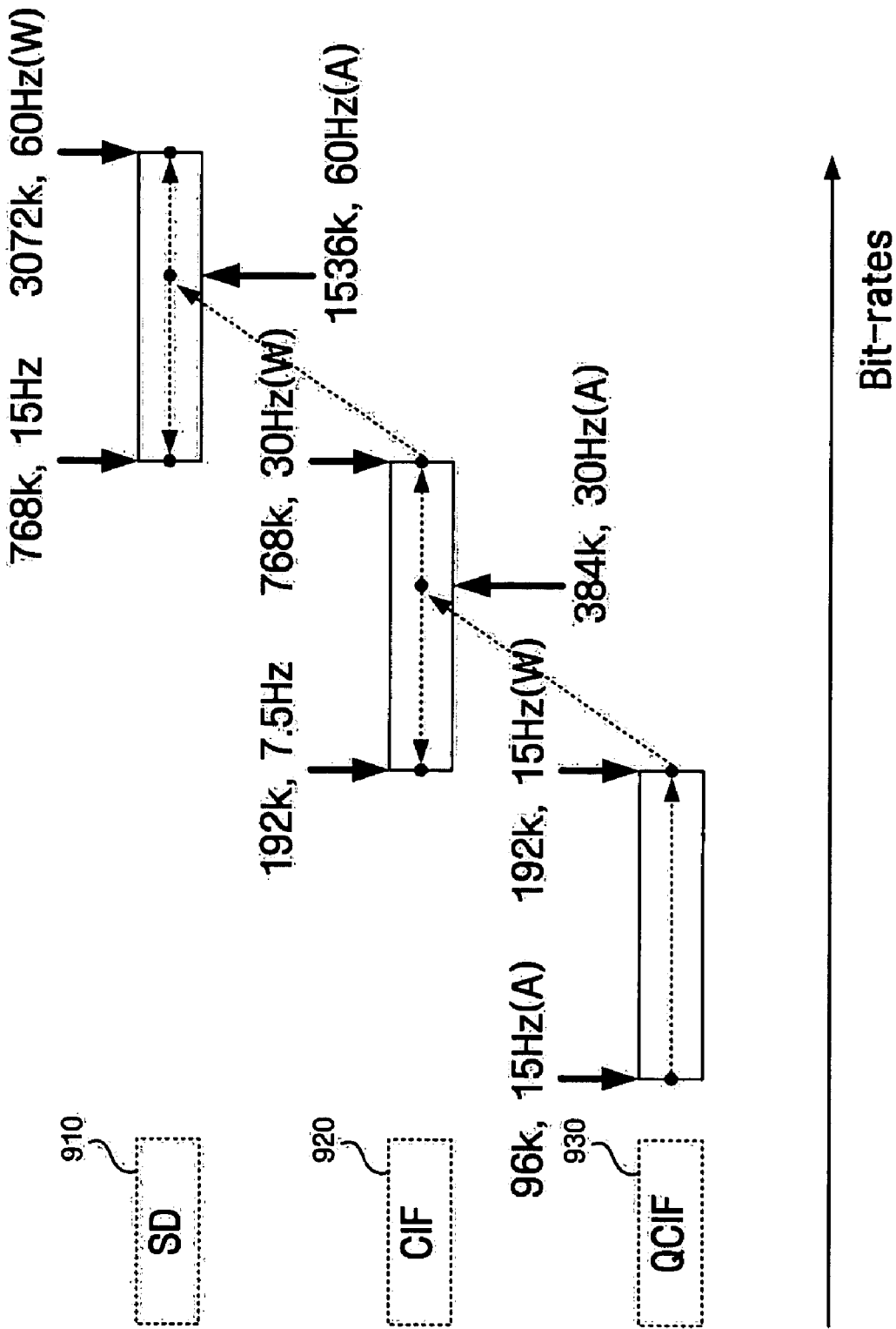
FIG. 9 illustrates a process of allocating a bit-rate for each layer in a multi-layer video coding process according to an exemplary embodiment of the present invention.

FIG. 9 illustrates a process of allocating a bit-rate for each layer in a multi-layer video coding process according to an exemplary embodiment of the present invention. For convenience of explanation, it is assumed that a multi-layer video encoder supports three different resolutions layers, i.e., QCIF, CIF, and SD layers.

Scalability requirements for video coding are that a QCIF layer 930 have 15 Hz frame rate and 96 to 192 kbps bit-rate, a CIF layer 920 have 7.5 to 30 Hz frame rate, 192 to 768 kbps bit-rate, and a SD layer 910 have 15 to 60 Hz frame rate and 768 to 3072 kbps bit-rate.

First, video coding for the QCIF layer 930 will be described. The multi-layer video encoder performs AVC coding on a QCIF frame to produce an AVC-coded QCIF layer frame having 96 kbps bit-rate and 15 Hz frame rate. Then, the encoder performs wavelet coding on the QCIF frame using the AVC-coded frame to generate a wavelet-coded QCIF layer frame having 192 kbps bit-rate and 15 Hz frame rate.

Next, video coding for the CIF layer 920 will be described.

The encoder performs AVC coding on a CIF frame to generate an AVC-coded CIF layer frame having the maximum frame rate of 30 Hz available for the CIF layer 920. To reconstruct a video frame having 192 kbps bit-rate and 7.5 Hz frame rate, the AVC-coded and wavelet-coded QCIF layer frames and a part of AVC-coded CIF layer frame are needed.

The encoder then performs wavelet coding on the CIF frame to generate a wavelet-coded CIF layer frame having the maximum frame rate of 30 Hz allowable for the CIF layer 920. To reconstruct a video frame having a 384 to 768 kbps frame rate, the AVC-coded and wavelet-coded QCIF layer frames, the AVC-coded CIF layer frame, and a part of the wavelet-coded CIF layer frame are needed.

Lastly, video coding for the SD layer 910 will be described.

The encoder performs AVC coding on a SD frame to generate an AVC-coded SD layer frame having the maximum frame rate of 60 Hz available for the SD layer 910. To reconstruct a video frame having 768 kbps bit-rate and 15 Hz frame rate, the AVC-coded and wavelet-coded QCIF layer frames, the AVC-coded and wavelet-coded CIF layer frames, and a part of AVC-coded SD layer frame are needed.

The encoder then performs wavelet coding on the SD frame to generate a wavelet-coded SD layer frame having the maximum frame rate of 60 Hz allowable for the SD layer 910. To reconstruct a video frame having a 1536 to 3072 kbps frame rate, the AVC-coded and wavelet-coded QCIF layer frames, the AVC-coded and wavelet-coded CIF layer frames, the AVC-coded SD layer frame, and a part of the wavelet-coded SD layer frame are needed.

Figure 10:
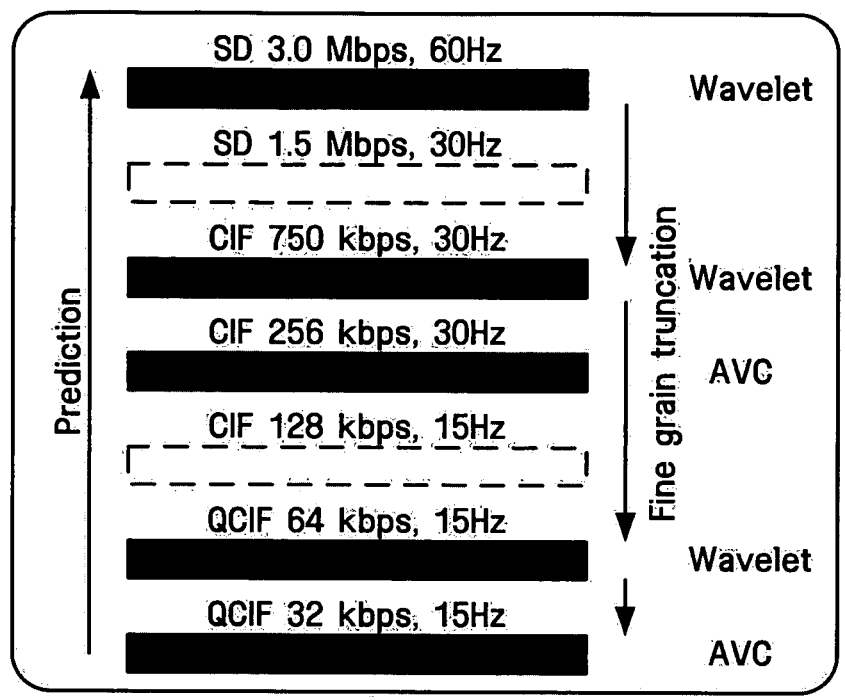
FIGS. 10 and 11 show structures of multi-layer video bitstreams according to exemplary embodiments of the present invention.
Figure 11:
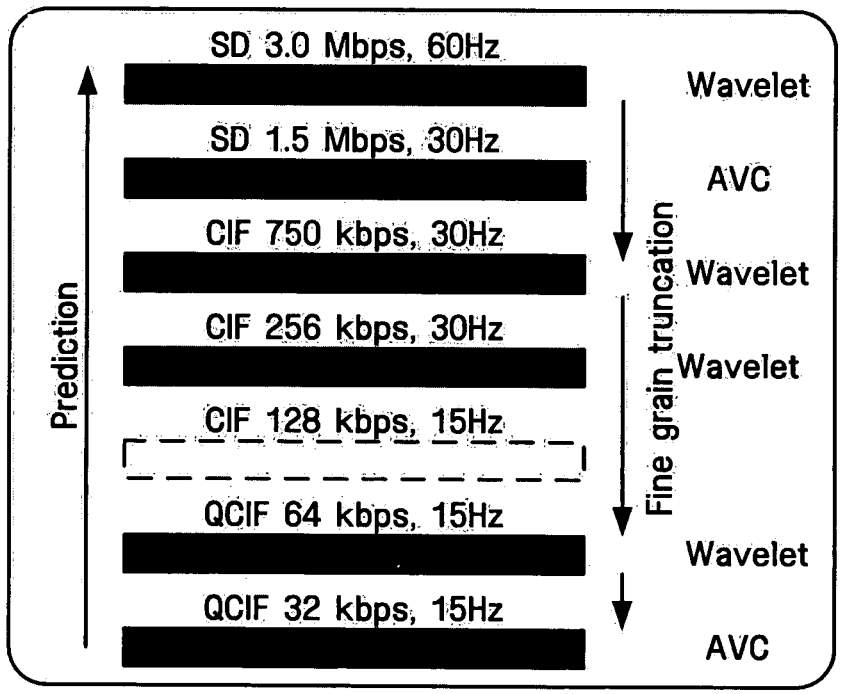

The multi-layer video coding may be implemented in various other ways. FIGS. 10 and 11 show the structures of multi-layer video bitstreams according to further exemplary embodiments of the present invention.

Unlike the bitstream shown in FIG. 4, the bitstream shown in FIG. 10 has a SD layer encoded using only wavelet coding since a video frame having a lower bit-rate of 1.5 Mbps is easy to reconstruct from a wavelet-coded bitstream having a high resolution and a sufficient bit-rate, e.g., 3.0 Mbps.

Figure 12:
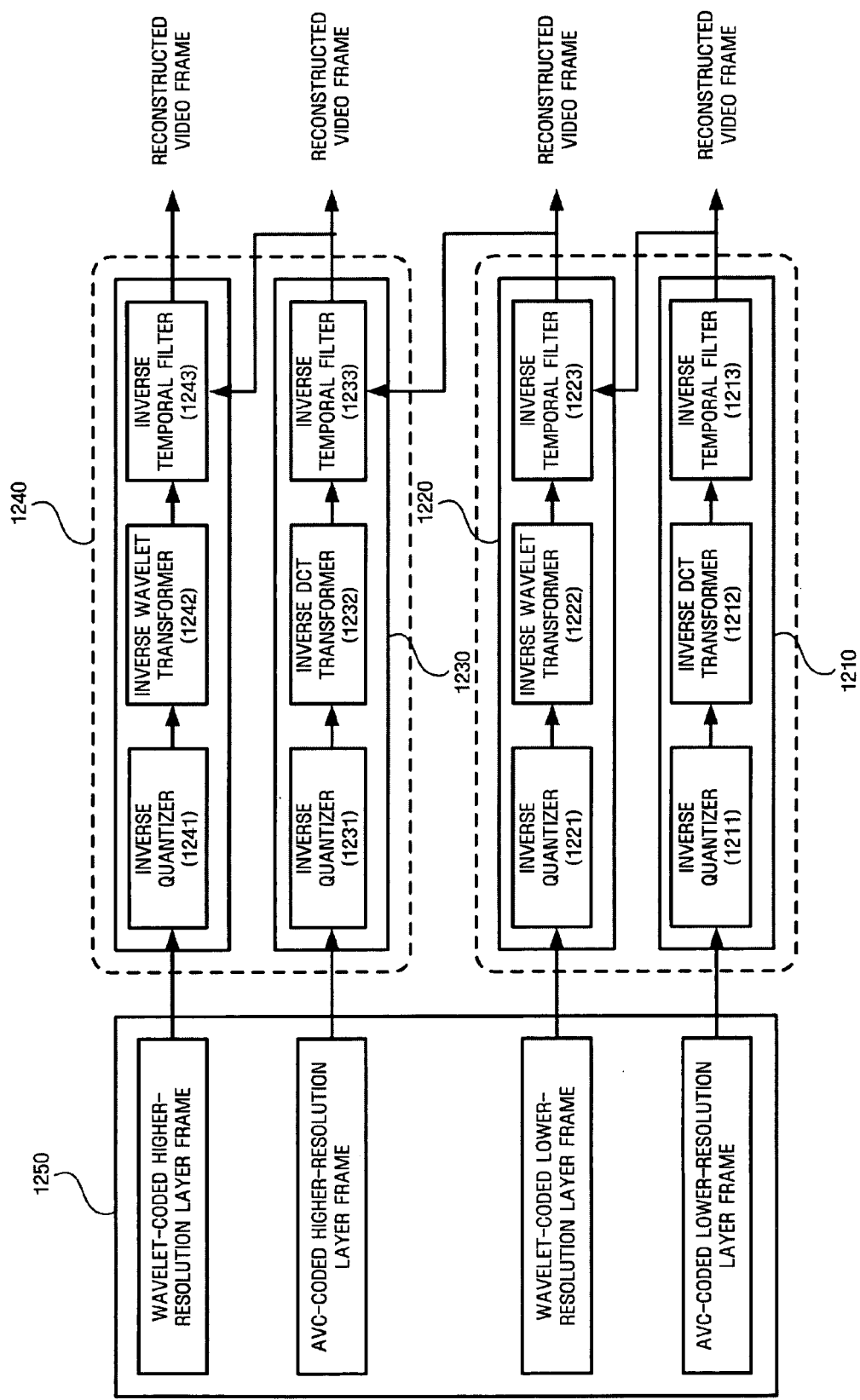
FIG. 12 is a block diagram of a multi-layer video decoder according to an exemplary embodiment of the present invention.

FIG. 12 is a block diagram of a multi-layer video decoder according to an exemplary embodiment of the present invention. For convenience of explanation, it is assumed that the video decoder reconstructs video frames from a bitstream having two resolution layers.

Referring to FIG. 12, the multi-layer video decoder includes a bitstream interpreter 1250, an AVC decoding unit 1210 and a wavelet decoding unit 1220 decoding encoded low-resolution layer video frames, and an AVC decoding unit 1230 and a wavelet decoding unit 1240 decoding encoded high-resolution layer video frames.

The bitstream interpreter 1250 extracts encoded high- and low-resolution layer frames from an input bitstream. The encoded low-resolution layer frames consist of an AVC-coded low-resolution layer frame and a wavelet-coded low-resolution layer frame while the encoded high-resolution layer frames consist of an AVC-coded high-resolution layer frame and a wavelet-coded high-resolution layer frame.

The AVC decoding unit 1210 for the low-resolution layer includes an inverse quantizer 1211 inversely quantizing the AVC-coded low-resolution layer frame, an inverse DCT transformer 1212 performing inverse DCT on the inversely quantized frame, and an inverse temporal filter 1213 performing inverse temporal filtering on the frame subjected to the inverse DCT.

The wavelet decoding unit 1220 for the low-resolution layer includes an inverse quantizer 1221 inversely quantizing the wavelet-coded low-resolution layer frame using a video frame reconstructed by the AVC decoding unit 1210, an inverse wavelet transformer 1222 performing inverse wavelet on the inversely quantized frame, and an inverse temporal filter 1223 performing inverse temporal filtering on the frame subjected to the inverse wavelet transform.

The AVC decoding unit 1230 for the high-resolution layer includes an inverse quantizer 1231 inversely quantizing the AVC-coded high-resolution layer frame using a video frame reconstructed by the wavelet decoding unit 1220 for the low-resolution layer, an inverse DCT transformer 1232 performing inverse DCT on the inversely quantized frame, and an inverse temporal filter 1233 performing inverse temporal filtering on the inversely DCT-transformed frame.

The wavelet decoding unit 1240 for the high-resolution layer includes an inverse quantizer 1241 inversely quantizing the wavelet-coded high-resolution layer frame using a video frame reconstructed by the AVC decoding unit 1230, an inverse wavelet transformer 1242 performing inverse wavelet on the inversely quantized frame, and an inverse temporal filter 1243 performing inverse temporal filtering on the inversely wavelet-transformed frame.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they are executed on one or more computers in a communication system.

Figure 13:
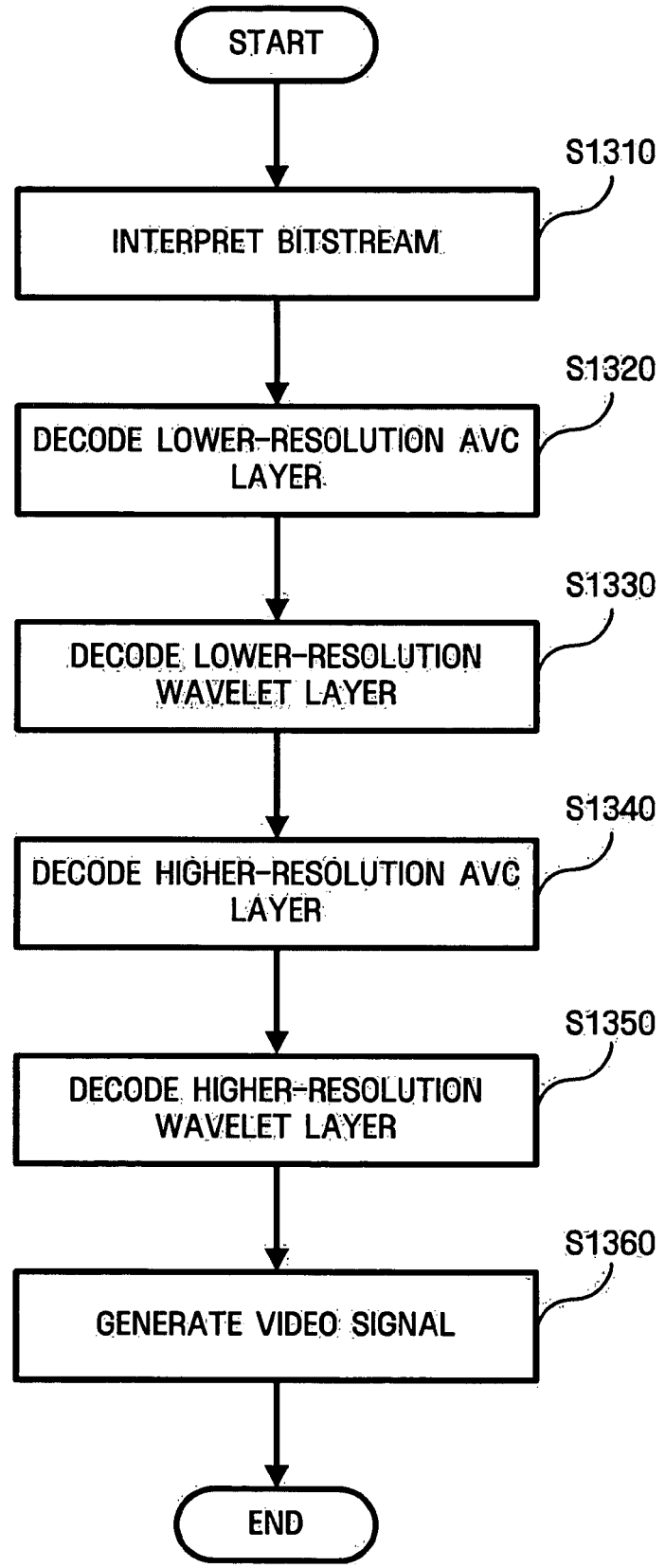
FIG. 13 is a flowchart illustrating a multi-layer video decoding process according to an exemplary embodiment of the present invention.

FIG. 13 is a flowchart illustrating a multi-layer video decoding process according to an exemplary embodiment of the present invention.

Referring to FIG. 13, in operation S1310, when a bitstream is fed into a multi-layer video decoder, the multi-layer video decoder interprets the bitstream and extracts coded high- and low-resolution frames from the bitstream.

After extracting the coded frames, in operation S1320, AVC decoding is performed on an AVC-coded low-resolution layer frame, among the coded frames, to decode a low-resolution AVC layer. A video frame reconstructed by decoding the low-resolution AVC layer is used to decode a low-resolution wavelet layer.

In operation S1330, the encoder uses the video frame reconstructed by decoding the low-resolution AVC layer to decode a low-resolution wavelet layer. That is, wavelet decoding is performed on a wavelet-coded low-resolution layer frame among the coded frames using the video frame reconstructed by decoding the low-resolution AVC layer in order to decode the low-resolution wavelet layer. A video frame reconstructed by decoding the low-resolution wavelet layer is provided to decode a high-resolution AVC layer.

In operation S1340, the encoder uses the video frame reconstructed by decoding the low-resolution wavelet layer to decode a high-resolution AVC layer. That is, AVC decoding is performed on an AVC-coded high-resolution layer frame among the coded frames using the video frame reconstructed by decoding the low-resolution wavelet layer in order to decode the high-resolution AVC layer. A video frame reconstructed by decoding the high-resolution AVC layer is provided to decode a high-resolution wavelet layer.

In operation S1350, the encoder uses the video frame reconstructed by decoding the high-resolution AVC layer to decode the high-resolution wavelet layer. That is, wavelet decoding is performed on a wavelet-coded high-resolution layer frame among the coded frames using the video frame reconstructed by decoding the high-resolution AVC layer in order to decode the high-resolution wavelet layer.

In operation S1360, after completing decoding on all layers, the multi-layer video decoder uses the reconstructed video frames to generate a video signal that is then displayed through a display device.

As described above, the coding and decoding methods according to exemplary embodiments of the present invention allow a predetermined resolution layer to be encoded/decoded using a plurality of different video coding schemes, thereby providing excellent scalability and coding efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, while one resolution layer has been described to include an AVC layer and a wavelet layer, the resolution layer may consist of two layers using other coding algorithms. Furthermore, while it is described above that one resolution layer is encoded using two video coding schemes, the resolution layer may be encoded using three or more video coding schemes.

What is claimed is:

1. A video decoding method comprising:
   receiving a bitstream of an encoded video signal; and
   decoding the encoded video signal,
   wherein the bitstream structure comprises:
   a first region that contains information on the encoded video signal in a base layer;
   a second region that has a different resolution or a different frame rate than the base layer of the encoded video signal and comprises information on an upper layer of the encoded video signal that is encoded using information on the base layer; and
   a third region that contains information on an enhancement layer of the encoded video signal to enhance a bit rate of the video signal.

2. The video decoding method of claim 1, wherein the base layer and the upper layer are encoded using discrete cosine transform DCT.

3. The video decoding method of claim 1, wherein the base layer is encoded according to the H.264 standard.

4. The video decoding method of claim 1, wherein the third region contains the information on the enhancement layer of the encoded video signal to enhance a bit rate of the base layer.

5. The video decoding method of claim 1, wherein the third region contains the information on the enhancement layer of the encoded video signal to enhance a bit rate of the upper layer.

6. A video decoding method comprising:
   using a processor to perform the steps of:
   reconstructing a base layer of a video signal;
   reconstructing information on an upper layer of the video signal using information on the base layer; and
   reconstructing an enhancement layer of the video signal to enhance a bit rate of the video signal.

7. The method of claim 6, wherein the base layer is reconstructed according to the H.264 standard.

8. The method of claim 6, wherein the upper layer is reconstructed using reverse DCT.

9. The method of claim 6, wherein the enhancement layer is reconstructed using reverse wavelet transform algorithm.

10. The method of claim 6, wherein the enhancement layer is reconstructed to enhance a bit rate of the base layer.

11. The method of claim 6, wherein the enhancement layer is reconstructed to enhance a bit rate of the upper layer.

12. The method of claim 6, further comprising adding the enhancement layer and the upper layer.

13. A video decoding method comprising:
    using a processor to perform the steps of:
    reconstructing a base layer of a video signal;
    reconstructing an enhancement layer of the video signal to enhance a bit rate of the base layer; and
    reconstructing information on an upper layer using information on the base layer and the enhancement layer.

14. The method of claim 13, wherein the base layer is reconstructed according to the H.264 standard.

15. The method of claim 13, wherein the upper layer is reconstructed using reverse DCT.

16. The method of claim 13, wherein the enhancement layer is reconstructed using reverse wavelet transform algorithm.

* * * * *